(12) United States Patent
Slate

(10) Patent No.: US 7,207,476 B1
(45) Date of Patent: Apr. 24, 2007

(54) PUBLIC RELATIONS AND DELIVERY SYSTEM

(76) Inventor: William B. Slate, 175 Austin Ryer La., Branford, CT (US) 06405

( * ) Notice: Subject to any disclaimer, the term of this patent is extended or adjusted under 35 U.S.C. 154(b) by 207 days.

(21) Appl. No.: 10/673,731

(22) Filed: Sep. 29, 2003

Related U.S. Application Data

(60) Provisional application No. 60/415,173, filed on Sep. 30, 2002.

(51) Int. Cl.
*G06F 17/00* (2006.01)

(52) U.S. Cl. .................. 235/375; 235/380; 235/383

(58) Field of Classification Search ............... 235/375, 235/380, 383; 707/102
See application file for complete search history.

(56) References Cited

U.S. PATENT DOCUMENTS

| | | | | |
|---|---|---|---|---|
| 5,963,951 A | * | 10/1999 | Collins | 707/102 |
| 6,061,681 A | * | 5/2000 | Collins | 707/5 |
| 6,250,549 B1 | * | 6/2001 | DeFabio, Jr. | 235/380 |
| 6,269,366 B1 | * | 7/2001 | Romano et al. | 707/6 |
| 2001/0010330 A1 | | 8/2001 | DeFabio, Jr. | |
| 2002/0012134 A1 | | 1/2002 | Calaway | |

OTHER PUBLICATIONS

Sony Electronics e-Solutions Company LLC, http://www.imagestation.com/shop (printed Apr. 14, 2003).

* cited by examiner

*Primary Examiner*—Karl D. Frech

(57) ABSTRACT

Via a publicly-accessible computer network for a selected public figure a user is permitted to select a photograph of the public figure based upon identifying information associated with the photograph. The user is permitted to purchase a copy of the selected photograph. The user is advantageously permitted to specify that the photograph copy be autographed by the selected public figure.

17 Claims, 1 Drawing Sheet

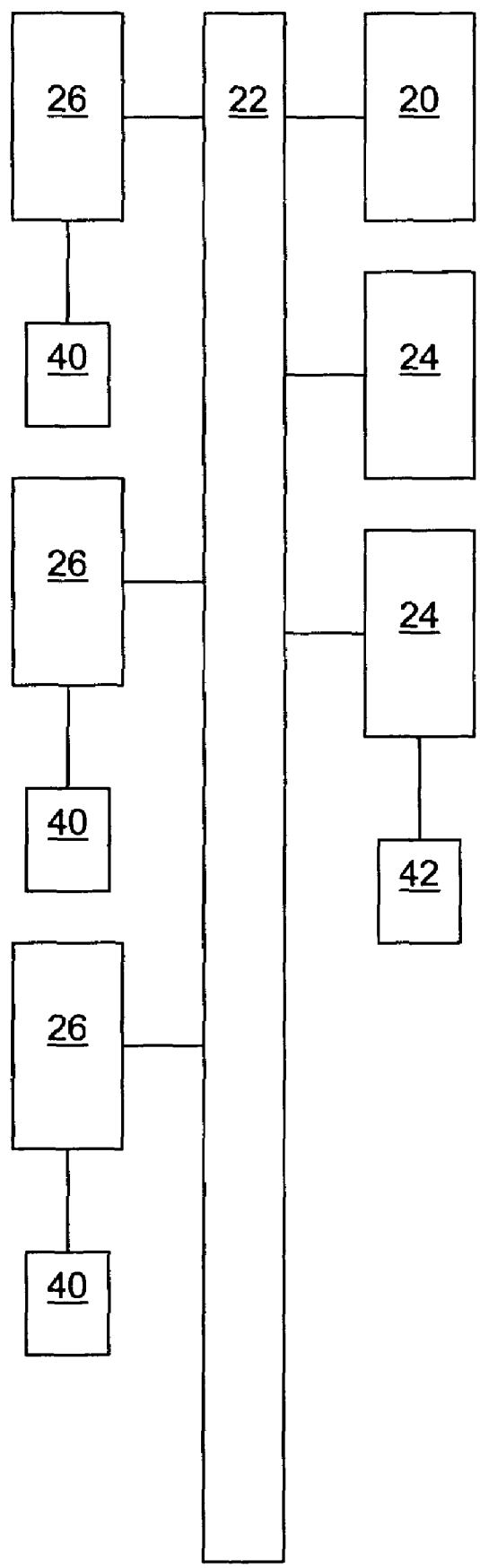

PUBLIC RELATIONS AND DELIVERY SYSTEM

CROSS-REFERENCE TO RELATED APPLICATION

Benefit is claimed of U.S. provisional patent application 60/415,173, filed Sep. 30, 2002 and the disclosure of which is incorporated by reference herein as if set forth at length.

BACKGROUND OF THE INVENTION (1) Field of the Invention

The invention relates to public relations (PR) and, more particularly to public relations for celebrities and their affiliated organizations.

(2) Description of the Related Art

In hindsight, it has been proposed to distribute of photographs of sporting events, weddings, proms, graduations, etc. over the internet (e.g., US20020012134A1 which identifies superposition of digitally generated celebrity autographs). It has separately been proposed to vend memorabilia including autographed memorabilia over the internet and use various technologies for authentication (e.g., US20010010330A1). Various underlying software technologies have been developed for such purposes. Various celebrities and their affiliate organizations maintain internet sites for publicity/PR purposes.

SUMMARY OF THE INVENTION

One or more photographers photograph one or more celebrities' interactions with additional persons (e.g., fans). The photographs are transferred to a database. One or more users (e.g., one of the fans or a friend/relative) may access a global computer network and then access a list of the celebrities and select a particular celebrity. For the selected celebrity, the user selects a time designation associated with one or more photographs of the selected celebrity and one or more of the fans. The user views at least one such photograph displayed responsive to such selection of such time designation and causes a print of said photograph to be made.

In various implementations, the user may access an organization- or event-specific site or page prior to accessing the list. The print may be printed on a printer connected to a computer of the user or on a local network associated therewith. The print may be printed remotely and the user may provide instructions for delivery of said print. The instructions may comprise instructions for delivery of said print to a third party who is among the one or more additional persons in the photograph. The user may provide a payment for the print and receive a receipt for said payment. The receipt may indicate that at least a portion of the payment is tax deductible. The list may be accessed via a pull-down menu.

BRIEF DESCRIPTION OF THE DRAWING

The drawing FIGURE is a schematic diagram of a system for delivering photographs in accordance with the invention.

DETAILED DESCRIPTION

A celebrity (e.g., a sports FIGURE, an actor/actress, a politician or other noteworthy public FIGURE) may have substantial day-to-day interaction with members of the public. These may occur under a variety of circumstances with a variety of degrees of planning by the celebrity and/or by the individual members of the public (hereinafter, as appropriate, "fans"). Often, a fan will want to memorialize his/her meeting with a celebrity in a photograph. This can pose a number of problems. For example, the fan may not have an affiliated cameraperson (e.g., a friend or relative) in position to conveniently take the photograph. It may be cumbersome for the fan to get a stranger to photograph the fan using the fan's camera. The fan may not have use of a camera. Having to interact with multiple cameras for multiple fans is an inconvenience to the celebrity. In some venues, this may be regarded as a security risk and, therefore, unauthorized cameras may be barred.

Additionally, many fans will want their photograph to be autographed by the celebrity. With all but instant photography, this is highly impractical. Even with instant photography, it imposes further inconveniences on the celebrity. Denial of such autographs can produce bad public relations.

In an implementation of the inventive concepts, during his/her interaction with fans, a celebrity is advantageously accompanied by a professional photographer. The photographer is advantageously an employee or agent of the celebrity, or of the celebrity's employer (e.g., a sports team), or otherwise in privity with the celebrity (e.g., contracted by the celebrity's manager). The photographer photographs the celebrity's interaction with fans. Advantageously, a very high rate of photographs are taken so that nearly all fans who have a personal interaction with the celebrity are clearly captured in one or more photographs. The photographer advantageously uses a digital still camera that records a time and date for each photograph taken.

At appropriate times (e.g., the end of each day), the digital photographs are transferred from the memory of the camera or associated removable or remote medium to a database or other electronic data structure on an exemplary photo storage server 20. Certain photographs from the photographer(s) may be selectively omitted, such as photographs that are poor quality or unflattering, photographs that might be misused for commercial purposes (e.g., featuring an undesired or non-sponsoring trademark or product), or otherwise undesirable photographs (e.g., without identifiable fans). Aspects of such photographs are made available to the public via a public computer network 22 (e.g., through an HTML page or site on the internet's worldwide web). The page/site (hereafter simply site) may be one dedicated to the particular celebrity, to a team, musical group, or other publicly distinguished organization with which the celebrity is affiliated, or may be a general web site through which photographs of various apparently unrelated celebrities may be accessed. The web site may be stored on the same computer that functions as a photo server or on one or more additional servers 24 interconnected therewith via a local and/or public network (e.g., 22).When a person publicly accesses the web site (e.g., via that person's personal computer 26 running a web browser or another terminal accessing the network and preferably having a display device (e.g., video monitor), input device (e.g., keyboard and pointing device) central processing unit, and memory), the person may have the option of selecting a particular celebrity if the site supports more than one (via pull down menu, link, etc.). A person can also (preferably subsequently) identify a relevant time or time period. Other user access options include public computers or terminals (e.g., kiosks, such as at a facility associated with the relevant celebrity, team or other organization).

With the inventive system in place, a fan who has an interaction with a subject celebrity will realize that the interaction has been photographed and will know that the information is accessible. The fan (or other person accompanying the fan, such as a parent) will also be in a position to remember the approximate time of the interaction. An accessing person (who can be the fan, a friend, family member, etc.) can select or enter the celebrity and the remembered time, an approximation thereof, or a range encompassing it. The web site advantageously displays an image (e.g., a low-resolution image) of one or more photographs associated with the selected time or time range. Alternatively or additionally, this image may have some form of copy protection or a defacement such as a digital watermark. Advantageously, the image(s) are displayed along with the associated date and time (or range thereof). The accessing person then advantageously has the ability to scroll or click through the photographs or jump forward or back in time (for example, the person may realize from viewing the first displayed photograph that his/her estimated time was too early and may wish to jump substantially ahead). Eventually, the person can view a desired photograph. For example, the desired photograph may include the person's interaction with the celebrity or an interaction of a friend or relative of the person with the celebrity.

The web site may provide the accessing person with a number of options for retrieving a selected photograph. In certain embodiments, a low or medium resolution image of the photograph may be captured or downloaded with no charge and clear instructions may be provided on how to do so. Such image may be printed on a consumer printer 40 connected to the computer 26 Other products and services may be subject to payment. These may include: downloading a high-resolution image; and ordering prints for mail or other delivery. Among options for prints are the selection of: size; quality (e.g., resolution, paper quality, reproduction technique); accessories (e.g., framing); and autographing. These may be printed on a printer 42 connected to one of the servers 24 or by a similarly interconnected printer of a third party fulfillment vendor or may be projected onto and developed on photographic paper The autographing may have various levels or options, potentially being price dependent. A basic autographing could comprise the autograph of the celebrity absent any message. There may be options for the basic autographing (e.g., selection of full celebrity name, nickname(s), jersey number, and the like). Customization parameters may include having the celebrity add the name of the photographed fan, which may be entered by the accessing person (consumer) manually or selected from a menu or list of pre-approved common or normal names (e.g., Adam, Alan, Albert . . . ). Other options include having a pull down or other menu of pre-approved messages such as: "Happy Birthday"; "To a great fan"; and the like. A further option would be to allow the consumer to enter a custom message. The most basic custom message might be a fan name if no menu is provided or if the desired name is not on the list. This is advantageously made subject to approval/veto by the celebrity, his agent, site sponsor, or other person and, particularly for more detailed messages (e.g., beyond a name) would be subject to a particularly high premium fee (could depend upon the nature of the message, such as being type or length dependent). The message is advantageously written by the celebrity in his or her own writing on the print of the selected photograph along with the autograph. Optionally, the celebrity may digitally do this. Optionally, the message only may be electronically generated. Less desirably from a PR point of view would be the superposition of a non-unique digital image of the celebrity's signature in lieu or an actual autograph.

The site would provide for credit card, debit card, electronic wallet, COD, and/or other payment provisions. It could also provide for various shipping options as are well known or otherwise. Such payment and shipping processing could be handled on one or more of the servers 24 or on an interconnected third party server maintained by a third party that routinely provides such processing services.

At least a portion of proceeds are advantageously donated to one or more nonprofit charitable organizations. All or portions of such donations may be tax-deductible to the system provider, sponsor, and/or the consumer. The provider or sponsor may be a tax-exempt charitable organization. To the extent that payments are treated as a tax-deductible contribution of the consumer, a receipt could be generated that is printable by the consumer on the consumer printer 40 or otherwise deliverable to the consumer to identify that deductible portion. Printable receipts are particularly advantageous when the products are being delivered to a third party (e.g., the photographed fan when the consumer is a friend/relative) as a gift or if the products are downloadable images rather than prints, etc.

Other revenue streams may be involved, and the issues of deductible v. non-deductible and deductible to whom may vary. For example, the purchase may include a first component for the basic print, a second component for framing and a third component for a message and autograph. In one implementation, only the last is deductible to the consumer. The former two may be for-profit sales by the provider/sponsor or may have components donated by the provider/sponsor to charity and be correspondingly deductible. The site may sell other goods and services to consumers on a for-profit or non-profit basis. The sites may sell third party advertising/linking on a for-profit or non-profit basis.

Depending upon the implementation, such a system may have a number of PR advantages. It is time efficient for the celebrity to not have to pose for individual photographers, allowing the celebrity to have some combination of reduced time expenditure and/or exposure to an increased number of fans. The presence of a photographer increases availability of photographs beyond those fans who otherwise would have been able to have a photograph taken. Free images may provide substantially all fans encountering the celebrity with the possibility of a substantially no cost memento (e.g., by printing a low resolution image of the selected photograph on the printer 40). The premium services can provide fans with other opportunities. The charitable association of the premium service helps defeat any impression that that celebrity is gouging. In particular, as applied to the autographs, a relatively high price or prices would provide an effective rationing mechanism, also controlling the amount of time the celebrity feels obliged to spend autographing. The combination of the free downloads leaving few persons feeling totally left out with the charitable nature of premium services is a powerful image building technique. The celebrity may become more comfortable in refusing in-person requests to autograph items (e.g., programs, balls and other products) and sincere fans (e.g., those wanting the memento for themselves rather than to resell) may prefer the photographs, thereby reducing the demand for such in-person autographing. The reduction in in-person autographing may bolster the market for autographed items sold by the celebrity or for which the celebrity sells autographing services (e.g., at card shows).

Among additional variations is the possibility of an authentication procedure for autographed photos. The autographed photos themselves may be provided with a number of self authentication features. In one simple example, the photograph may bear some indicia of the time stamp (either on the image or elsewhere such as the back of the photograph, the frame, and the like). One might be able to use the web site to enter the time stamp or another provided authentication code. This might bring up an authentication in the form of a message indicating that someone had purchased the autographed photo, and perhaps identifying the purchaser. Alternatively, a scanned image of the autograph on the photo could be provided for comparison. Rarely, if ever, would more than a few autographed copies of any given photograph likely have been produced, making authentication by this method fairly easy.

As noted above, the sites may be celebrity specific, organization specific, event specific, or otherwise. An exemplary event specific site may be a site for a political party convention (e.g., the 2004 convention of that party). If organized exclusively by celebrity (politician or other noteworthy attendee), the photographs of each celebrity may be aggregated from different photographers and individual photographers may end up taking photographs of numerous celebrities. When more than one celebrity appears in a given photograph, such photograph may be indexed with respect to each such celebrity and the autographing options may permit autographing by one to all such celebrities. Different options may be available for different celebrities. For example, there may be different associated charities. For some or all celebrities the accessing person may have a choice of charities so as to not tie such celebrities to a particular charity that not all persons may favor. Some celebrities may opt in or out of particular features such as particular autographing options. Some celebrities at the event may opt out entirely.

Alternatives involve organization by photographer, location, etc. For example, photographers (or their cameras) at an event or venue may be numbered. This may be the case for fixed position or roving photographers. The web site could organize the photographs by such numbers or other indicia. This may be appropriate where the number of celebrities greatly exceeds the number of available photographers so that having a roving photographer for every celebrity would be impractical. Hybrid systems are also possible.

Although digital cameras are preferred, film cameras may be used with scanned images made available over the network. Also, video cameras may be used in lieu of still cameras. In the extreme, the cameras may be high resolution digital video (DV) cameras. An accessing user may view a video clip, starting at, centered about, or otherwise associated with the entered time/date at reduced resolution and reduced frame count (e.g., 2–5 frames (scans) per second culled from the 20–30 frames per second of the recording). The user may have appropriate fast-forward, rewind, slow, and pause capabilities. When the user gets to a desired point in the clip, the user may cause the frame count to increase about that point to permit the user to select a particular frame in the original recording to serve as the photograph.

One or more embodiments of the present invention have been described. Nevertheless, it will be understood that various modifications may be made without departing from the spirit and scope of the invention. For example, many known or yet developed technologies may be applied to the system. Accordingly, other embodiments are within the scope of the following claims.

What is claimed is:

1. A method comprising:
   a user accessing a global computer network;
   the user accessing a list of celebrities;
   the user selecting a particular celebrity;
   for the selected celebrity, the user selecting a time designation associated with one or more photographs of the selected celebrity and one or more additional persons;
   the user viewing at least one such photograph displayed responsive to such selection of such time designation; and
   the user causing a print of said photograph to be made.

2. The method of claim 1 further comprising:
   the user accessing an event-specific site or page prior to accessing the list.

3. The method of claim 1 further comprising:
   the user accessing an organization-specific site or page prior to accessing the list.

4. The method of claim 1 wherein said print is printed on a printer connected to a computer of the user or on a local network associated therewith.

5. The method of claim 1 wherein said print is printed remotely and the method comprises the user providing instructions for delivery of said print.

6. The method of claim 5 wherein said instructions comprise instructions for delivery of said print to a person who is among the one or more additional persons in the photograph.

7. The method of claim 1 further comprising:
   the user providing a payment for said print; and
   the user receiving a receipt for said payment.

8. The method of claim 7 wherein said receipt indicates that at least a portion of the payment is tax deductible.

9. The method of claim 1 further comprising the user identifying a name of at least one person of the one or more additional persons and specifying that the print bear the name of the identified at least one person and be autographed by the selected celebrity.

10. A method comprising:
    via a publicly-accessible computer network:
       for a given public figure, permitting a user to select a photograph of said public figure from a plurality of photographs of said public figure based upon identifying information comprising information associated with the time or time period the photograph was taken;
       permitting the user to purchase a copy of the selected photograph;
       permitting the user to specify that the photograph copy be autographed by the selected public figure;
       permitting the user to select the selected public figure from a group of public figures;
       permitting the user to download a first quality of image of the selected photograph without charge; and
       permitting the user to purchase a second quality of the selected image, different from the first quality of image.

11. The method of claim 10 wherein said identifying information comprises:
    information identifying a particular camera or a particular photographer or a particular location from a plurality of cameras or photographers or locations at a given event.

12. The method of claim 10 further comprising:
    providing an indication that a portion of any purchase payment will be donated to charity.

13. The method of claim 10 wherein:

the identifying information comprises an indicia of when the photograph was taken.

14. A method comprising:

via a publicly-accessible computer network:

for a given public figure, permitting a user to select a photograph of said public figure from a plurality of photographs of said public figure based upon identifying information comprising information associated with the time or time period the photograph was taken;

permitting the user to purchase a copy of the selected photograph;

permitting the user to specify that the photograph copy be autographed by the selected public figure; and providing the user with the option of selecting a name to which the public figure is to address the autograph.

15. A method comprising:

via a publicly-accessible computer network:

for a given public figure, permitting a user to select a photograph of said public figure from a plurality of photographs of said public figure based upon identifying information comprising information associated with the time or time period the photograph was taken;

permitting the user to purchase a copy of the selected photograph;

permitting the user to specify that the photograph copy be autographed by the selected public figure; and providing the user with the option of choosing from a finite pre-approved selection of messages for the public figure to write with the autograph.

16. A method comprising:

via a publicly-accessible computer network:

for a given public figure, permitting a user to select a photograph of said public figure from a plurality of photographs of said public figure based upon identifying information comprising information associated with the time or time period the photograph was taken;

permitting the user to purchase a copy of the selected photograph;

permitting the user to specify that the photograph copy be autographed by the selected public figure; and providing a receipt indicating an amount that is tax-deductible.

17. A method comprising:

via a publicly-accessible computer network:

for a given public figure, permitting a user to select a photograph of said public figure from a plurality of photographs of said public figure based upon identifying information comprising information associated with the time or time period the photograph was taken;

permitting the user to purchase a copy of the selected photograph;

permitting the user to specify that the photograph copy be autographed by the selected public figure; and permitting the user to select a charity to which a portion of a payment of the user will be donated from a finite group of charitable organizations.

\* \* \* \* \*